April 18, 1944.  S. S. LA SHA  2,346,977
AIRPLANE
Filed May 9, 1941  2 Sheets-Sheet 1

INVENTOR
Stanley S. LaSha
BY
Beau, Brooks, Buckley & Beau.
ATTORNEYS

April 18, 1944.  S. S. LA SHA  2,346,977
AIRPLANE
Filed May 9, 1941  2 Sheets-Sheet 2

INVENTOR
Stanley S. LaSha
BY
Beau, Brooks, Buckley & Beau.
ATTORNEYS

Patented Apr. 18, 1944

2,346,977

UNITED STATES PATENT OFFICE 2,346,977
AIRPLANE

Stanley S. La Sha, Kenmore, N. Y., assignor to
Bell Aircraft Corporation, Buffalo, N. Y.

Application May 9, 1941, Serial No. 392,703

4 Claims. (Cl. 244—129)

This invention relates to aircraft, and more particularly to improved aircraft of the closed cabin type. One of the objects of the invention is to provide an improved airplane of the closed passenger compartment type having an improved means for emergency exit during flight of the occupants therefrom for parachute landing purposes. Another object of the invention is to provide in an aircraft a passenger compartment closure device of improved form. Other objects and advantages of the invention will appear from the specification hereinafter.

Figure 1:
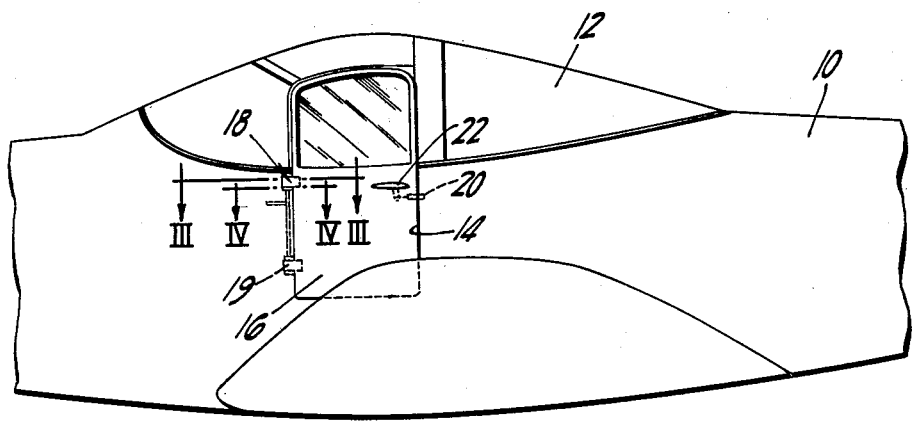
Fig. 1 is a fragmentary side elevation of an airplane of the invention.

The invention is illustrated in conjunction with an airplane comprising generally a fuselage 10 having a transparent canopy 12 arranged to constitute a cover portion of the passenger compartment thereof. A passenger entrance and exitway is provided as indicated at 14 in a side wall portion of the fuselage and is arranged to extend upwardly into the canopied section 12 so as to provide the entrance-exitway of such dimensions as to conveniently accommodate movements of the airplane passengers therethrough. The passageway 14 is arranged to be closed by means of a door 16 which is shaped in outline so as to conform to the contour of the passageway 14 and in profile so as to cooperate with adjacent portions of the fuselage 10 to provide the streamlined outer contour of the airplane body.

The door 16 is arranged to be connected to the fuselage by means of latch devices at front and rear edge portions of the door arranged to engage adjacent portions of the fuselage structure. Specifically, the latching means at the forward edge door 16 is illustrated as comprising a pair of vertically spaced fixtures designated generally in Fig. 1 at 18 and 19, and at the rear edge of the door 16 a conventional type slide-bolt latch device 20 is arranged to be retractable from engaging position by manipulation of a conveniently disposed handle 22.

Figure 2:
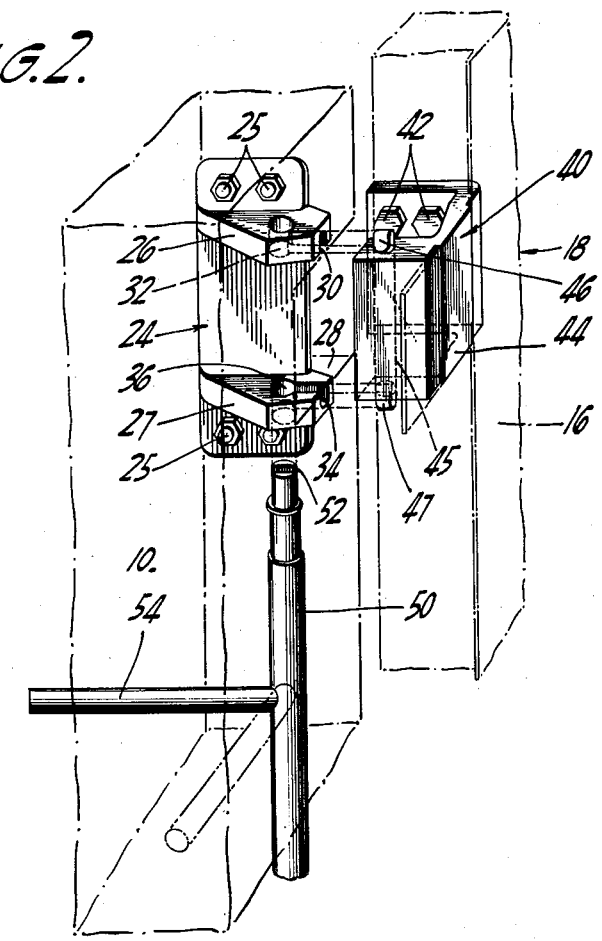
Fig. 2 is a fragmentary view in perspective, on an enlarged scale, of a portion of the exit mechanism shown in disassembled relation.
Figure 3:
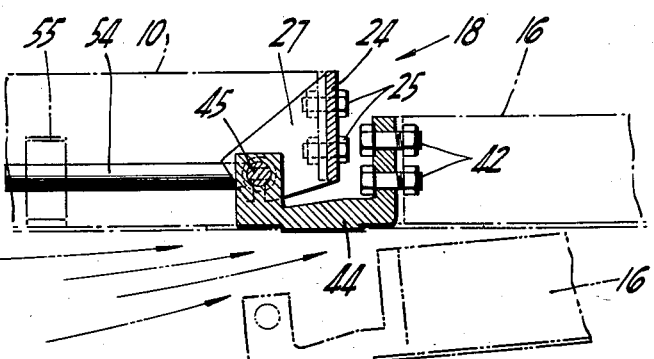
Fig. 3 is a fragmentary section, on an enlarged scale, taken substantially along line III—III of Fig. 1.

The upper fixture 18 is illustrated in detail in Figs. 2 and 3, and is shown as comprising a bracket 24 which is bolted to an edge portion of the fuselage in the region of the passageway 14, as by means of bolts 25. The bracket 24 includes a pair of spaced abutments 26—27 which extend in substantially horizontal and parallel relation into a suitably recessed portion 28 of the fuselage structure forwardly of the general line of the passageway opening 14. The upper abutment 26 is laterally grooved through the lower face thereof as at 30 and bored as at 32 at the inner end of the groove 30. The lower abutment 27 is similarly grooved in its upper face portion at 34 and bored at 36.

A second bracket 40 of the fixture 18 is bolted to the door 16 as at 42, and is provided with a forwardly extending body portion 44 which carries a pivot pin 45. The pivot pin 45 is rotatably carried by the bracket 40 so as to be disposed with its longitudinal axis extending vertically, and the pin 45 is dimensioned so as to extend at its opposite ends 46—47 beyond the upper and lower face portions of the bracket body portion 44 so that the extending end portions of the pin 45 are adapted to be slidably received within the grooved and bored portions of the abutments 26—27 of the bracket 24. The body portion 44 of the bracket 40 is vertically dimensioned so as to be freely movable between the abutments 26—27 of the bracket 24.

Figures 4, 5:
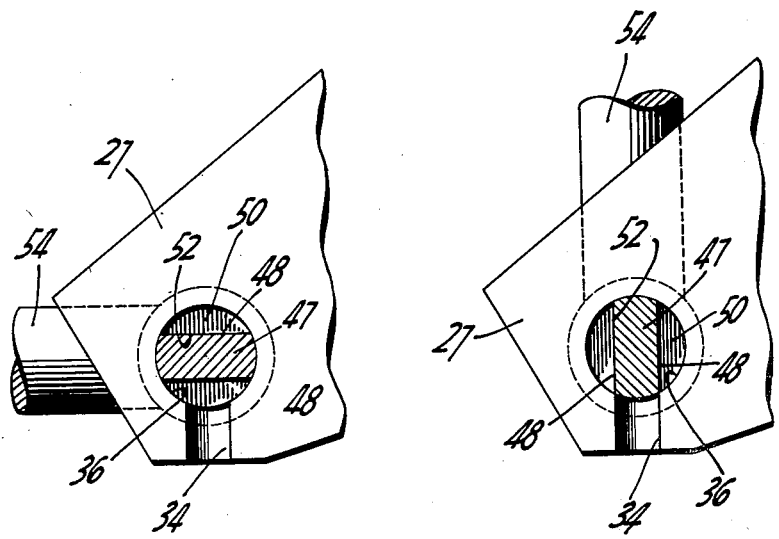
Fig. 4 is a fragmentary section, on an enlarged scale, taken substantially along line IV—IV of Fig. 1.
Fig. 5 is a view corresponding to Fig. 4 of a portion of the exit mechanism in another position of adjustment.

The pin 45 is generally of cylindrical form but the extending end portions 46—47 thereof are similarly flattened so as to provide aligned flat face portions 48 (Figs. 4 and 5). The grooved portions 30—34 of the abutments 26—27 are so proportioned as to receive the flattened end portions of the pin 45 in laterally slidable relation whenever the pin 45 is so disposed that the flat face portions 48 are aligned with the direction of the abutment grooves, as illustrated in Fig. 5. The bored portions 32—36 of the abutments are so dimensioned that when the pin 45 is disposed concentrically thereof the pin may be rotated so as to dispose the flattened end portions transversely of the directions of the grooved portions of the abutments, as illustrated in Figs. 3 and 4, whereupon the pin 45 interconnects the bracket devices 24—40 in the manner of a hinge pintle pin and the bracket 40 is thereby hingedly mounted upon the bracket 24 so as to be rotatable relative thereto about an axis extending through the centers of the bored portions 32—36. As indicated at 19 in Fig. 1, a second fixture similar to the fixture 18 is provided in spaced relation therefrom so as to have the hinge axes thereof in alignment, whereby the door 16 is arranged to be hingedly mounted at its forward edge to the fuselage 10 as long as the pins 45 of the fixture devices are arranged in bracket engaging relation as explained hereinabove.

Means for rotating the fixture pins 45 of the brackets 18—19 are provided as illustrated in the drawings as comprising a control rod 50 arranged to extend vertically between the fixtures 18—19 and into operative connection at its opposite ends with the corresponding bracket pins 45—45. The control rod 50 is provided with opposite end portions of generally cylindrical form arranged to extend into the corresponding bored portions of the brackets 24—24 so as to be mounted therein for rotation about the longitudinal axis of the control rod 50. The rod 50 is slotted at its opposite end portions as indicated at 52 (Figs. 2, 4, 5) so as to be adapted to slidably engage in keyed relation thereat with the adjacent end portions of the pin devices 45—45 of the upper and lower fixtures. Thus, the control rod 50 is adapted to be rotated to simultaneously actuate the pins 45—45 of the upper and lower fixture devices between bracket engaging and disengaging positions; and a laterally extending handle 54 is provided on the control rod 50 for convenient manual manipulation to provide the aforesaid adjustments of the pins 45—45. Preferably the handle 54 is arranged to extend from the control rod 50 so as to be disposed parallel to the adjacent inner wall portion of the airplane fuselage when the pins 45 are engaged by the control rod 50 and axially disposed so as to provide interconnection of the bracket members of the fixture devices, as illustrated in Fig. 4. A releasable retainer device 55 (Fig. 3) is preferably arranged in conjunction with the handle of the control rod 50 so as to be adapted to normally retain the control rod in bracket engaging position. The retainer 55 is illustrated as being of a spring finger type and fixed to the fuselage 10 so as to extend into engagement with the control handle 54 for holding the latter against accidental displacement from the position of Figs. 3 and 4, but it will be understood that the handle 54 may be forcibly displaced from engagement with the retainer 55 for rotation of the control rod to the position of Fig. 5.

Thus, it will be understood that the door 16 is arranged to be mounted upon the fuselage cabin wall so as to constitute a closure for the passageway 14 in such manner that when the door is in closed position the door outer surface is in smooth continuation of adjacent outer surface portions of the fuselage 10 for desired aerodynamic effects. Fig. 2 illustrates the cooperative arrangement of the control rod and upper fixture elements; illustrating the relation of the parts just prior to assembly thereof, and it will be understood that the lower fixture 19 will be similarly assembled simultaneously with assembly of the upper bracket 18. It will be noted that to mount the door 16 upon the fuselage it is only required to mount the control rod 50 between the fuselage-carried brackets 24—24 of the upper and lower fixtures 18—19 so as to be rotatably carried thereby, and then to position the handle of the control member 50 in the solid line position of Fig. 2 so that the door-carried brackets 40 of the upper and lower fixtures may be inserted into operative position relative to the brackets 24 by sliding movement of the pin ends 46—47 through corresponding grooved portions of the brackets 24—24, whereupon the control handle 54 may be displaced into substantial alignment with the fuselage wall and into latched engagement with the retainer 55 whereby the pins 45—45 will be simultaneously rotated to positions illustrated at Fig. 4. Thus the forward edge portion of the door 16 will be pivotally mounted upon the airplane fuselage and the door may be operated to swing in hinged relation upon the fixtures 18—19 between open and closed positions for normal entrance and exit purposes when the airplane is grounded; the latch controlling handle 22 being conveniently manipulatable by the airplane passengers for controlling the latching of the door at its rear edge in connection with the fuselage.

In event that it becomes necessary for the airplane passengers to abandon the airplane while in the air, the handle 54 is manually rotated from the positions of Figs. 1, 3 and 4 to the position of Fig. 5 whereupon the fixture pins 45 are axially adjusted so as to permit disengagement of the bracket members 40—40 from the corresponding bracket members 24—24. The forces of the airstream moving relative to the fuselage in the region of the door under such conditions will usually provide partial vacuum effects operating against the outer surface of the door sufficient to cause the forward edge of the door to move outwardly out of line with the fuselage outer surface upon adjustment of the fixture pins 45 to their released positions. However, if upon release of the pins, as described, the door 16 does not of its own accord move outwardly at its leading edge the application of a slight force thereagainst from inside of the airplane will suffice to move the leading edge of the door 16 outwardly into the airstream as illustrated by broken lines in Fig. 3. Thus the adjacent airstream will be admitted to impinge against the inside of the door 16 so as to forcibly swing it outwardly while rotating at its rear edge portion against the adjacent fuselage structure, until the door is blown completely clear of the airplane by the action of the airstream. For this result, the door latch device 20 is provided of such form as to present no interference with the pivotal movement of the door at its rear edge against the fuselage as described; the cooperating slide bolt and socket portions of the latch device 20 being so relatively proportioned as to allow the necessary lateral pivotal movement of the slide bolt in the engaging socket for this purpose. Thus, the passageway 14 is left completely unobstructed for easy exit of the passengers therethrough preparatory to parachute landings, and it will be understood that the invention thus provides for greatly increased passenger safety and an emergency exit arrangement providing increased convenience for the user and otherwise improved operation. For example, the emergency exit of the invention constitutes a marked improvement over previous forms of forwardly hinged cabin door arrangements wherein the doors must be forced open against the terrific pressures exerted thereon by the relative airstream and maintained in such open position before the passengers attempt to step through the doorways for parachute landing purposes. It will be understood that the present invention provides a normally inoperative emergency release mechanism in conjunction with the usually employed cabin door; the releasable mechanism functioning normally as a conventional hinge mechanism at the forward edge of the door, whereby maximum passenger convenience and safety is provided both in conjunction with normal use of the door when the airplane is grounded and in connection with emergency exits from the airplane preparatory to parachute landings.

It will be understood that in lieu of the specific arrangement of door mounting fixture and latch mechanisms illustrated and described hereinabove any other suitable arrangement of the essential elements of the invention may be employed. For example, any desired number of fixtures corresponding to the fixture 18 of Fig. 2 may be arranged in mutual alignment to normally connect the leading edge of the door to the fuselage. Also, any other suitable means for axially rotating the fixture pins 45 may be employed in lieu of the specific control rod and handle arrangement of the drawings; it being understood that the invention contemplates any suitable manually controllable mechanism for adjusting the bracket connecting pins for the purposes of the invention. Also, it will be understood that in lieu of the single latch device 20 of the drawings any other suitable latching arrangement for the rear edge portion of the door 16 may be employed; and that if desired a plurality of latch devices may be employed at spaced intervals along the rear edge of the door 16 and arranged to be controlled in operative connection with any other suitable form of manually operable handle for firmly holding the door 16 in latched relation to the fuselage during normal flight operations.

It will also be understood that the door connection mechanism of the invention provides important features and advantages in connection with the manufacture and maintenance of airplanes because of the fact that the door mounting fixture devices hereinafter described are interchangeable and may be manufactured in quantity and interchangeably mounted at any position along the door leading edges to provide the door mounting features of the invention. Also, the door mounting parts of the mechanism of the invention are of such character as to be easily and inexpensively manufactured, and subsequent to assembly of the respective connection parts upon the corresponding fuselage and door structures the door may be quickly and easily mounted and dismounted relative to the fuselage; and thus access to the interior of the airplane for repair and servicing operations is made available in an improved manner through complete removal of the door from the fuselage during such servicing operations in accord with the principles of operation of the invention.

Although only one form of the invention has been shown and described in detail, it will be apparent to those skilled in the art that the invention is not so limited but that various changes may be made therein without departing from the spirit of the invention or the scope of the appended claims.

I claim:

1. An escape door for aircraft, having releasable hinge means hingedly mounting the door at its upstream or front edge and latch means at its downstream or rear edge normally operating to secure the door closed, said latch means adapted upon the release of the releasable hinge means and the application of outward pressure to cause rearward and outward swinging of the front edge thereby disengaging the latch means to jettison the door, and means operable to release the hinge means for detaching the front edge of the door for such outward movement into the air stream.

2. An aircraft having a fuselage with an entrance opening, an escape door for the opening, releasable hinge means hingedly mounting the door at its upstream edge on the fuselage, latch means at the downstream edge of the door normally operating to secure the latter closed, said latch means adapted upon the release of the releasable hinge means and the application of outward pressure to cause rearward and outward swinging of the upstream edge thereby disengaging the latch to jettison the door, said releasable hinge means embodying a hinge pin having a terminal portion with major and minor axes and a hinge pin bearing having an escape slot of a width less than the major axis and greater than the minor axis through which the pin may be displaced to so disengage the upstream edge, and means operable to move the hinge pin to present either axis to the escape slot.

3. An aircraft having a fuselage with an entrance opening, an escape door for the opening, releasable hinge means hingedly mounting the door at its upstream edge on the fuselage, latch means at the downstream edge of the door normally operating to secure the latter closed, said latch means adapted upon the release of the releasable hinge means and the application of outward pressure to cause rearward and outward swinging of the upstream edge thereby disengaging the latch to jettison the door, said releasable hinge means embodying a hinge pin having a terminal portion with major and minor axes and a hinge pin bearing having an escape slot of a width less than the major axis and greater than the minor axis through which the pin may be displaced to so disengage the upstream edge, and a control member journaled in the bearing and having a slot receiving the terminal portion, said control member being rotatable to register its slot with the escape slot to form a continuation thereof through which the terminal portion may leave the bearing.

4. An aircraft having a fuselage with an entrance opening, an escape door for the opening, releasable hinge means hingedly mounting the door at its upstream edge on the fuselage, latch means at the downstream edge of the door normally engaging in a keeper recess in the fuselage and adapted to be withdrawn from the keeper recess by and during rearward and outward swinging of the upstream edge of the door about an axis adjacent the downstream edge to jettison the door, said releasable hinge means serving to release the upstream edge of the door whereby upon the application of outward pressure on the door such latch means will cause such rearward and outward swinging of the upstream edge of the door into the air stream, and means operable to release the hinge means for detaching the upstream edge of the door for such outward movement into the air stream.

STANLEY S. LA SHA.